(12) United States Patent
Gurevich et al.

(10) Patent No.: US 10,690,533 B2
(45) Date of Patent: Jun. 23, 2020

(54) ILLUMINATION PATTERN SYSTEM AND METHODS FOR 3D-TIME OF FLIGHT SYSTEMS

(71) Applicant: SYMBOL TECHNOLOGIES, LLC, Lincolnshire, IL (US)

(72) Inventors: Vladimir Gurevich, Great Neck, NY (US); David T. Shi, Setauket, NY (US)

(73) Assignee: Symbol Technologies, LLC, Holtsville, NY (US)

(*) Notice: Subject to any disclaimer, the term of this patent is extended or adjusted under 35 U.S.C. 154(b) by 0 days.

(21) Appl. No.: 15/858,411

(22) Filed: Dec. 29, 2017

(65) Prior Publication Data

US 2019/0204134 A1   Jul. 4, 2019

(51) Int. Cl.
| | | |
|---|---|---|
| G01F 17/00 | (2006.01) | |
| G01B 11/00 | (2006.01) | |
| G02B 5/02 | (2006.01) | |
| G01B 11/25 | (2006.01) | |

(52) U.S. Cl.
CPC .............. *G01F 17/00* (2013.01); *G01B 11/00* (2013.01); *G01B 11/2513* (2013.01); *G02B 5/0205* (2013.01)

(58) Field of Classification Search
CPC ........... G06K 7/10702; G06K 7/10732; G06K 7/10831; G06K 7/10722; G06K 7/10544; G06K 7/10811; F21S 41/155; F21S 41/28; F21S 41/285; G02B 27/48; G02B 26/10; G02B 5/0205; G01F 17/00; G01B 11/00; G01B 11/2513

USPC .......... 356/614–625; 235/454, 472.01, 462.2
See application file for complete search history.

(56) References Cited

U.S. PATENT DOCUMENTS

| | | | | |
|---|---|---|---|---|
| 4,677,473 A | * | 6/1987 | Okamoto | G01N 21/95684 228/105 |
| 5,473,436 A | * | 12/1995 | Fukazawa | G01B 11/24 250/559.23 |
| 5,598,280 A | * | 1/1997 | Nishio | F21V 5/04 349/57 |
| 6,542,236 B1 | * | 4/2003 | Kim | G01N 21/8806 356/394 |
| 7,545,516 B2 | * | 6/2009 | Jia | G01B 11/2527 356/602 |
| 2005/0264796 A1 | * | 12/2005 | Shaw | G01B 11/162 356/237.2 |
| 2009/0147239 A1 | * | 6/2009 | Zhu | G01S 7/285 356/3.12 |
| 2010/0103676 A1 | * | 4/2010 | Noeth | G02B 5/02 362/276 |
| 2010/0177164 A1 | * | 7/2010 | Zalevsky | G01B 11/162 348/46 |
| 2011/0043768 A1 | * | 2/2011 | Nakayama | G02B 27/48 353/38 |
| 2015/0167934 A1 | * | 6/2015 | Noeth | F21V 14/04 362/259 |

* cited by examiner

*Primary Examiner* — Sang H Nguyen
(74) *Attorney, Agent, or Firm* — Yuri Astvatsaturov (57) ABSTRACT

A system and method for illuminating a volume with an illumination system generating an illumination intensity pattern that maintains irradiance at sufficient on and off axis irradiance levels to allow for accurate identification and measure of objects within a volume, such as within a vehicle trailer or shipping container, is provided.

7 Claims, 6 Drawing Sheets

ILLUMINATION PATTERN SYSTEM AND METHODS FOR 3D-TIME OF FLIGHT SYSTEMS

BACKGROUND OF THE INVENTION

Three-dimensional (3D) sensors are used to measure loads within vehicle trailers and shipping containers. 3D sensors, for example, measure distances from a back-wall of a trailer/container to the nearest load-wall inside that trailer/container. From these distances, operators can determine such metrics as the available storage space within a volume Current 3D sensors are structured light (SL) 3D sensors used in Trailer Monitor Units (TMUs) mounted on vehicle trailers. For SL sensors, a projector projects an image into a volume (of the trailer/container), multiple cameras capture renditions of the projected image, and these renditions are image processed to determine relative distances of the back wall and objects in the volume. The process requires complex and time-consuming image processing, and the results are often inaccurate. Specifically, SL sensors are highly dependent on the light intensity in a volume. Yet, light intensity changes dramatically with the number of objects in the volume, or when differently shaped or differently sized objects are placed in the volume. The result is that conventional 3D sensors are of limited effectiveness in "smart" shipping application, where accurate assessment of trailer loads is desired.

Accordingly, there is a need for a system of illuminating a volume with an illumination pattern that maintains sufficient irradiance within a volume for accurate measurements of objects within the volume, while maintaining a maximum irradiance that provides safe operation of personnel within the volume.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As described herein, the embodiments of the present disclosure are directed to techniques for illuminating a volume with an illumination pattern that maintains illumination irradiances for sufficient on and off axis illumination of objects within a volume, such as a vehicle trailer or shipping container.

In some implementations, an illumination system includes a light source positioned at a proximal end of a volume, where the illumination system is configured to emit an output beam into the volume. The volume may be a shipping trailer, such as vehicle trailer, or a shipping container, or some other volume within which multiple objects for shipping may be placed. The illumination system may further include a diffuser positioned to receive the output beam from the illumination system. The diffuser may diffuse that output beam so that the output beam extends from a distal end plane of the volume to an interstitial plane in the volume, such as a plane of the nearest object placed within the volume. Further, the diffuser may be configured such that the output beam has a threshold illumination intensity such that the irradiance produced at a lateral off-axis extent of the distal end plane is above a threshold irradiance amount, and the diffuser may be further configured such that the illumination intensity of the output beam produces an irradiance at a lateral off-axis extent of the interstitial plane at or above this threshold irradiance amount at the lateral off-axis extent of the distal end plane. The result is the illumination of a volume, also termed herein an illumination volume, that satisfies a minimum irradiance threshold condition throughout the depth and lateral extent of that illumination volume.

In various embodiments, a system is provided for monitoring a volume. That system may include a processor, a memory, and an optical sensor, as well as an illumination system as described, all at a proximal end of the volume. In some embodiments, the light source is an infrared light source and the optical sensor is an infrared sensor. In some embodiments, the processor controls the optical sensor to measure infrared radiation reflected from an object within the volume. In various embodiments, the processor can determine distances of objects within the volume from the measured infrared radiation. In various embodiments, the processor can control the illumination intensity of the light source based on the measured infrared radiation. In some embodiments, the system is a time-of-flight system that measures distances of objects in the volume, by using a time-of-flight measurement.

Figure 1:
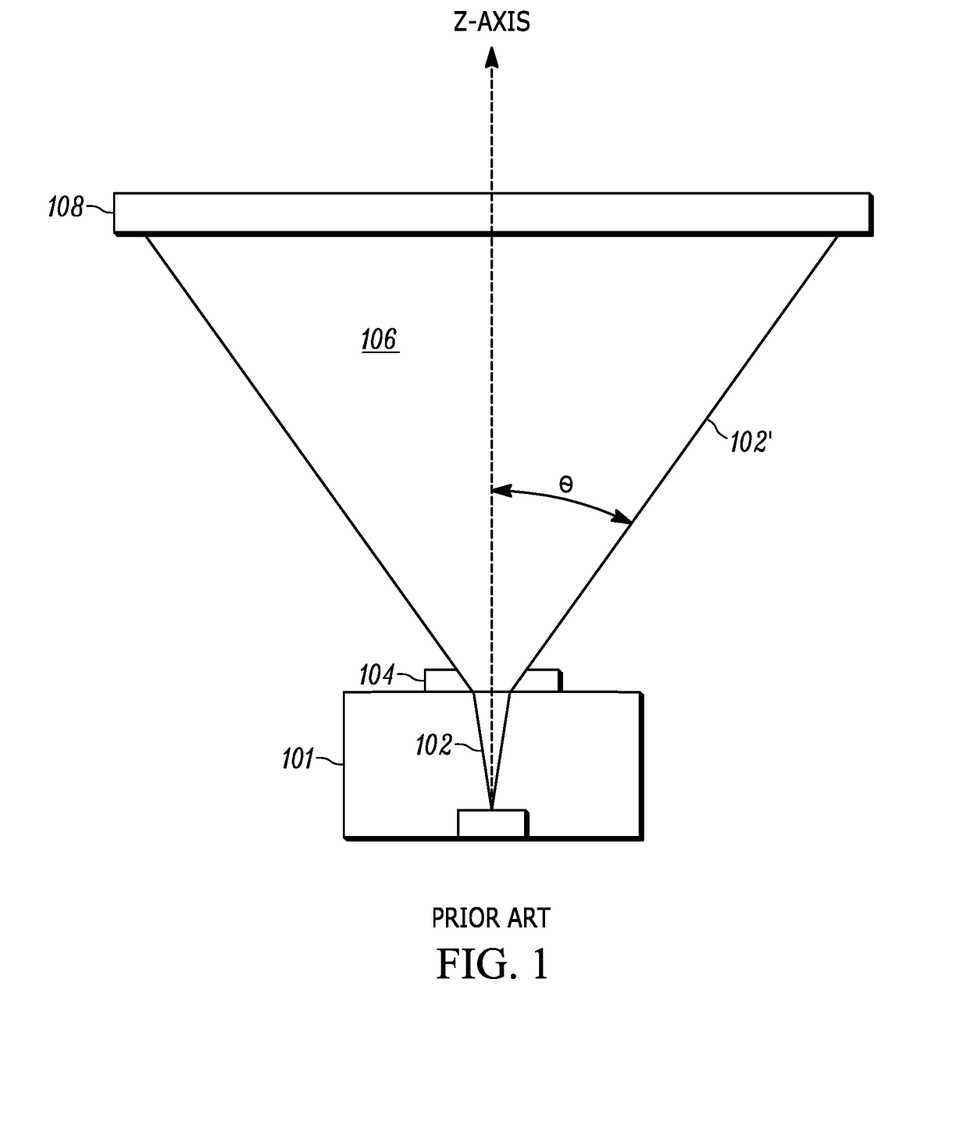
FIG. 1 is a schematic illustration of a prior art illumination system.

FIG. 1 is a diagram of a conventional illumination system 100, as used for 3D sensors such as those used in video game environments. A light source 101, which is commonly a laser light source, produces an output beam 102, while a diffuser 104 receives that output beam and converts it to an affected output beam 102' that evenly displaces the beam over solid angle volume 106, thereby forming a uniform irradiance of a flat screen 108. Such a conventional configuration is useful for gaming applications, which are short-range applications. The uniform irradiance at the screen 108 is important to optimize detection of an object in the solid angle volume 106. For example, as a gaming controller is moved anywhere within the volume, the 3D sensor can detect the gaming controller with the same accuracy. This uniformity is achievable, in part, because over the short distances of gaming applications, e.g., 5 m or shorter, the 3D sensor can operate effectively without use of a high intensity light out.

Unfortunately, configurations like that of FIG. 1 are not useful for large volume applications, e.g., volumes that extend greater that 5 m from the light source, and certainly not where personnel operate within the volume. The intensity of light required to maintain the uniform irradiance flat screen would be above established safe limits of laser output illumination intensity, when extended to a large volume.

Figure 2A:
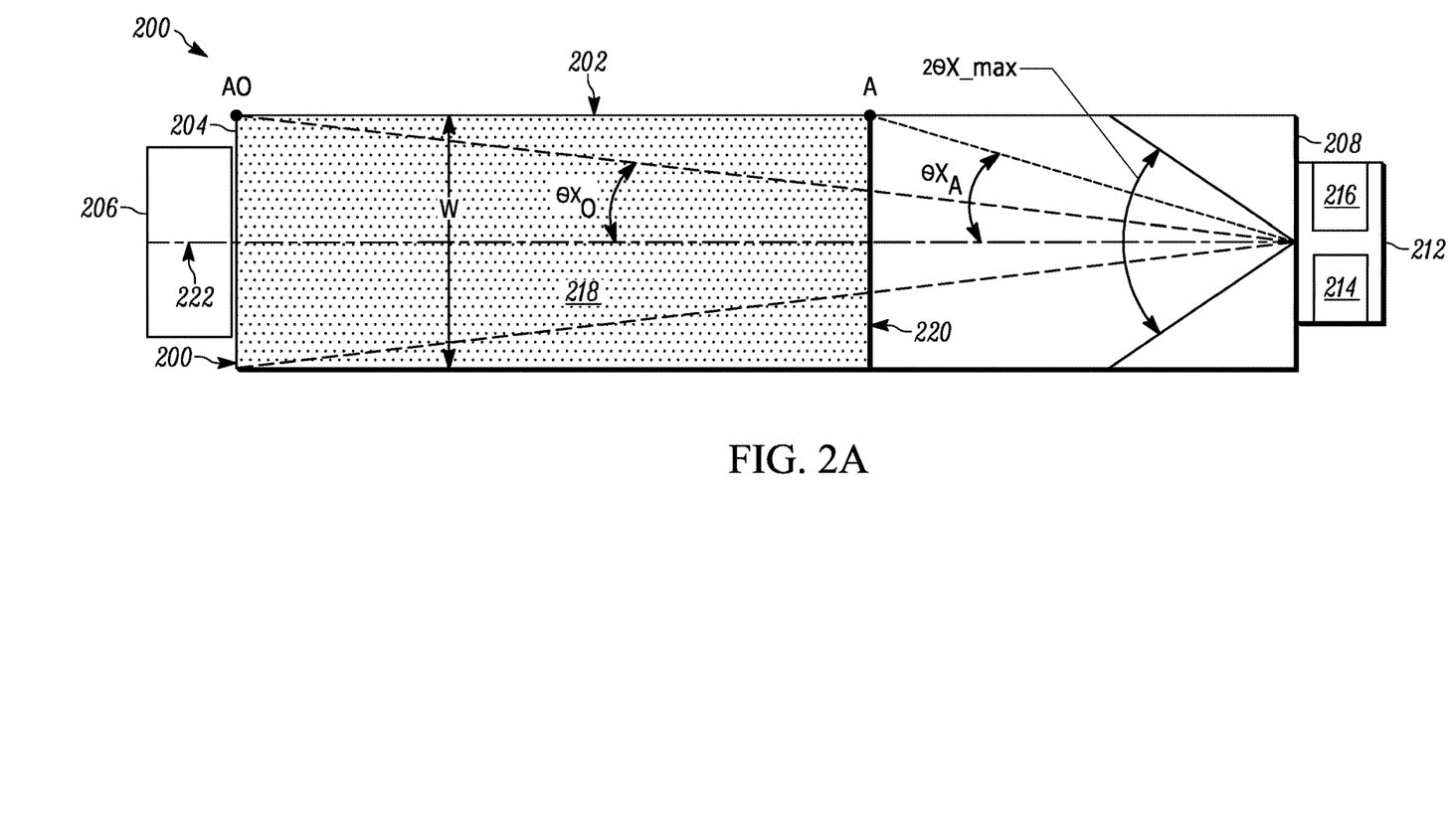
FIGS. 2A and 2B are example schematic illustrations of a top view and a side view, respectively, of a vehicle trailer with an example illumination system producing an example illumination pattern, in accordance with some embodiments.
Figure 2B:
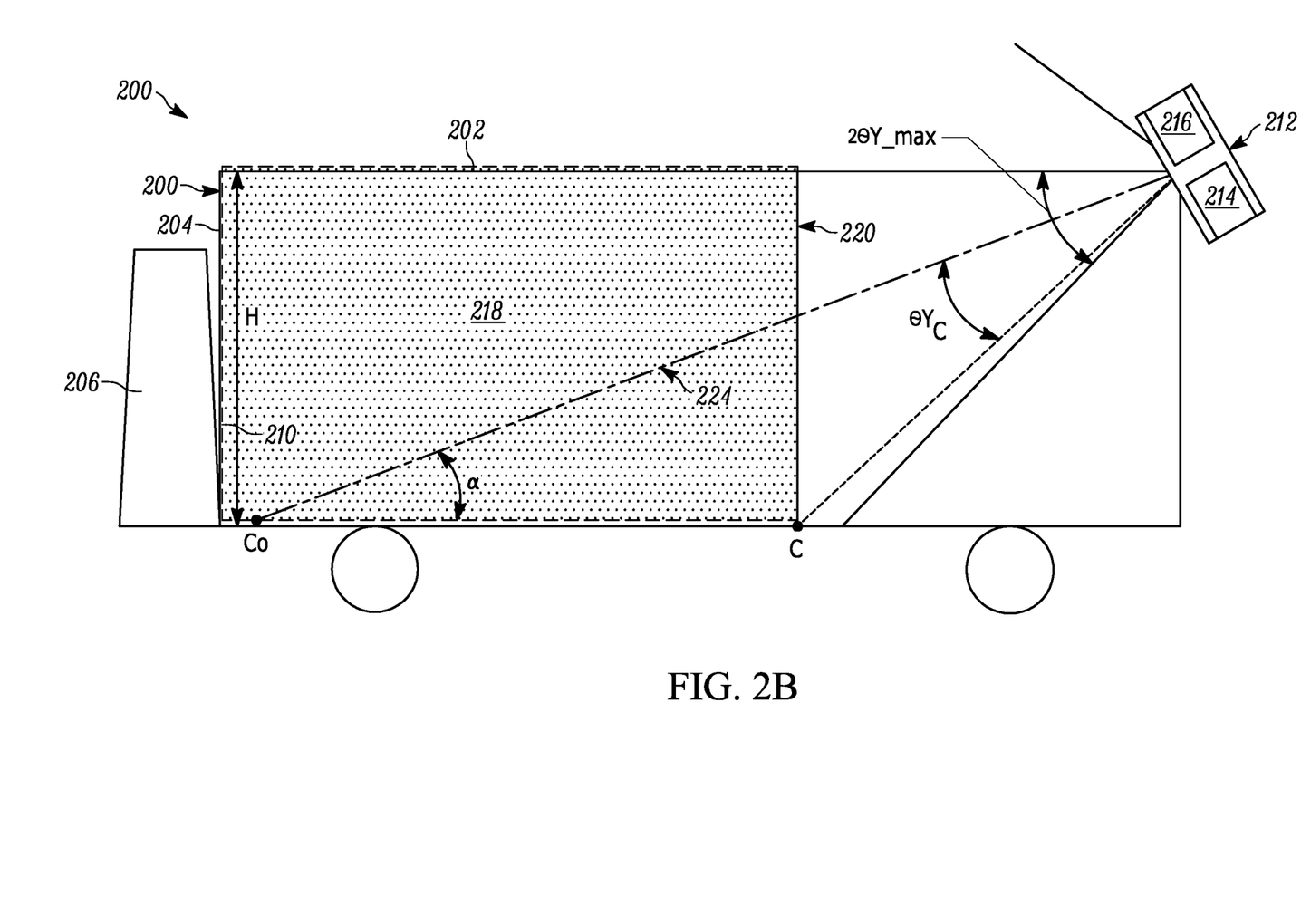

FIGS. 2A and 2B illustrate a schematic of an illumination system environment 200 in accordance with various example embodiments herein. FIG. 2A illustrates a top view of the illumination system environment 200, and FIG. 2B illustrates a side view.

The environment 200 may be implemented in trailer-based vehicle shipping application, as shown. In the illustrated example, the environment 200 includes a vehicle trailer 202 having a distal end 204, nearest to a vehicle cab 206, and a proximal end 208, at which personnel typically will access the trailer 202 by loading/offload objects for/from shipping.

For loading the vehicle trailer 202, typically personnel will access the proximal end 208 carrying objects onto a bed of the vehicle trailer 202, for example, using a forklift or other container carrier. In some examples, autonomous vehicles may be used to carry objects into the vehicle trailer 202. Initial objects are typically loaded against a back wall (at a distal end plane) 210 of the vehicle trailer 202, and subsequent objects are loaded until some or all of the back wall 210 is covered with objects. Objects will continue to be placed within the vehicle trailer 202 until a shipping volume within the vehicle trailer 202 is completed.

For applications such as 3D sensor measurements, to ensure proper illumination over the shipping volume within the vehicle trailer 202, the environment 200 further includes an illumination system 212 positioned at the proximal end 208. The illumination system 212 comprises a light source 214 that generates an output beam that is to be provided into the volume of the vehicle trailer 202. The light source 214 may contain one or more laser light sources, one or more light emitting diodes (LEDs), a combination thereof, or other suitable light source. A diffuser 216 is also included within the illumination system 212 and is positioned to receive an output beam from the light source 214 and diffuse that output beam, in accordance with examples herein.

The illumination system 212, with the combined light source 214 and diffuser 216, is configured to illuminate an illumination volume 218 within the vehicle trailer 202, where that illumination volume 218 extends from the back wall 210 to an interstitial plane 220 located between the distal end 204 and the proximal end 208. The interstitial plane 220 is marked with the points "A" and "C" in FIGS. 2A and 2B, respectively, where point "A" indicates a lateral off-axis extent of the interstitial plane 220, from an illumination x-axis 222, indicated by an off-axis angle, θx. The point "C" indicates another lateral off-axis extent of the interstitial plane 220, from an illumination y-axis 224, indicated by off-axis angle, θy. In a similar manner, at the back wall 210, a lateral off-axis extent is indicated by the point "$A_O$" measured from the illumination x-axis 222, and a lateral off-axis extent indicated by the point "$C_O$" measured from the illumination y-axis 224.

In the illustrated example, the illumination system 212 is configured to provide an output beam with an illumination intensive pattern that illuminates the volume 218, where that illumination pattern meets particular pattern criteria, and where the criteria are based on obtaining a desired irradiance over an illumination volume that extends from the back wall 20 to the interstitial plane 220.

In some embodiments, a first illumination intensity criterion is that the illumination system 212 be configured to maximize irradiance of the vehicle trailer 202, in particular at the back wall 210 (maximum back wall irradiance), while maintaining that irradiance (and thus the illumination intensity from the light source) at or below prescribed safety levels for personnel. Various examples of safety levels may be used to define the maximum back wall irradiance. An example safety level for a laser light source is to have a maximum illumination intensity from the laser source as set forth in the requirements of Class 1 for lasers, defined by 21 Code of Federal Regulations 1040 (21 C.F.R. 1040) in the United States, or as set forth internationally by the International Electrotechnical Commission (EIC) under regular EIC 60825. Either of these may be considered as defining a maximum permissible accessible emission limit.

In some embodiments, a second illumination intensity criterion is to maintain an off-axis extent irradiance of the interstitial plane 220 (i.e., at points "A" and/or "C") at or above a minimum irradiance established at the back wall. While other design criteria may be established, these two criteria, it has been found, allow for suitably strong irradiances at the back wall 210, while maintaining a minimum useful irradiance over the entire illumination volume 218, including over the entire depth and lateral extent, such that the entire illumination volume 218 is sufficiently illuminated for time of flight 3D sensor measurements.

Figure 3:
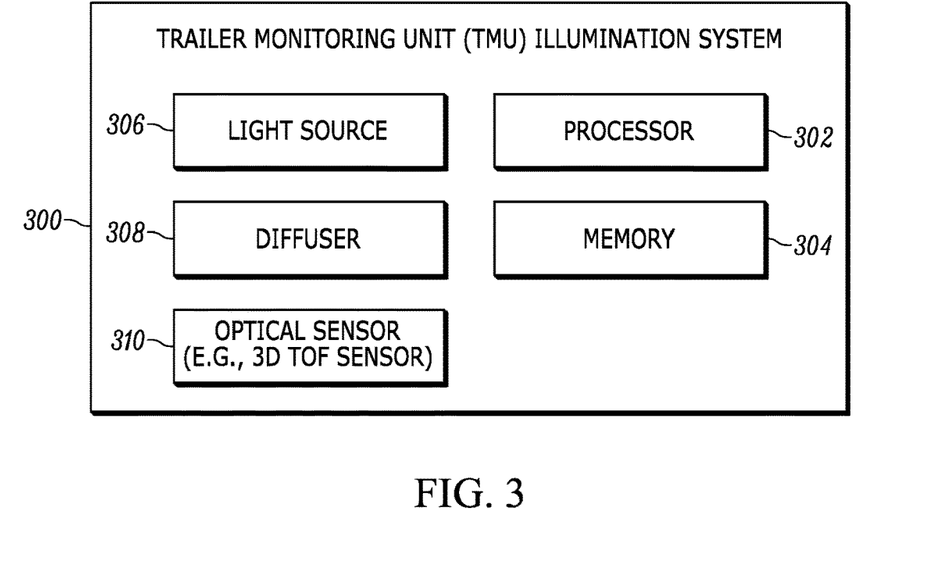
FIG. 3 is a schematic of an example illumination system, in accordance with some embodiments.

FIG. 3 illustrates an example implementation of an illumination system, such as the illumination system 212, formed as trailer monitoring unit configured to satisfy the aforementioned illumination pattern criteria. Illumination system 300 includes a processor 302 and memory 304 configured to perform any of the functions described herein. The illumination system 300 includes a light source 306 and a diffuser 308 positioned to receive an output beam from the light source 306 and alter that beam to produce the desired illumination pattern projected into the vehicle trailer 202. In some embodiments, the processor 302 is communicatively coupled to the light source 306 to control operation thereof. In some embodiments, the diffuser 308 may be a static element configured to produce a single desired illumination pattern. The diffuser 308 may be a thin film structure or a bulk structure, a flexible structure or rigid structure, by way of example. In other embodiments, the diffuser 308 may be a dynamic element that can be changed to produce different illumination patterns under different conditions. In some such embodiments, the diffuser 308 may be an electronically-controlled element, e.g., an electronically-controlled light shaping diffuser available from Luminit of Torrance, Calif., that is communicatively coupled to the processor 302 for controlling which illumination pattern is generated by the diffuser 308. The illumination system 300 further includes an optical sensor 310 communicatively coupled to the processor 302 for performing time-of-flight measurements and other functions, as described herein.

To satisfy the illumination intensity criteria, in various embodiments, the diffuser 308 is configured to produce an illumination intensity as follows.

The illumination intensity of the output beam from the illumination system 300 is indicated by $I(\theta)$, where $\theta$ is measured from a central (illumination) axis where the illumination intensity is highest and where output beam produces the highest irradiance at any plane within the volume (i.e., where the illumination axis interest that plane). In various examples, to maximize the illumination intensity $I_{max}(\theta)$ of the output beam, and more specifically to maximize irradiance at the back wall 210 (see, FIGS. 2A and 2B) within the limits of eye safety defined under Class 1, the diffuser 308 may be configured to satisfy standard EIC EN60825-1:2014, in which the accessible emission limit (AEL) is expressed in terms of radiation power within a 7 mm diameter detector (maximum size of eye pupil) at 100 mm from the diffuser surface (closest eye accommodation distance). AEL limits radiation intensity (power per solid angle) of illumination source Imax:

$$I_{max} = \frac{AEL}{\pi \frac{3.5 \text{ mm}^2}{100 \text{ mm}^2}} \quad (1)$$

The AEL is linearly proportional to angular size of the laser spot on diffuser as seen from 100 mm distance. When the viewing angle to diffuser (between eye sight and diffuser normal) $\theta$ increases, angular spot size decreases. Therefore, AEL is a function of the viewing angle $\theta$ to the diffuser. A conservative estimation of EIC EN60825-1:2014 was applied, such that AEL was treated as proportional to cosine angle $\theta$, resulting in an expression of the maximum illumination intensity, per angle, of the diffused output beam:

$$I_{max}(\theta) \propto \cos(\theta) \quad (2)$$

This relationship contrasts with conventional distribution, like of FIG. 1, in which the radiation intensity increased with angle $\theta$ to ensure uniform irradiance at the distal plane.

Therefore, in some embodiments, the diffuser 308 maximizes illumination intensity, $I(\theta)$, (and thus irradiance) at the back wall 210, according to the follow condition:

$$I(\theta) \leq I_{max}(\theta) = I_O \cos(\theta) \quad (3)$$

where $I_O$ is the on-axis illumination intensity, i.e., at $\theta=0$. The expression (3) provides the illumination intensity that is to be maintained over a range of off-axis angles whether in the x-direction (horizontal illumination intensity) or in the y-direction (vertical illumination intensity). In the example the x-direction, and considering irradiance at the back wall, i.e., $I_x(\theta)$, the suitable angles, as defined in FIGS. 2A and 2B, are such that $-\theta_{x0} < \theta_x < \theta_{x0}$ and $\theta_y < 0$. In the example of the y-direction, i.e., $I_y(\theta)$, the suitable angles are such that $-\theta_{y0} < \theta_y < \theta_{y0}$. Of course, these illumination intensity expressions are satisfied for any angle, $\theta$, for light illuminating an illumination volume, that is, $-\theta_{xA} < \theta_x < \theta_{xA}$ and $\theta_y < 0$ for the interstitial plane along the x-axis and $-\theta_{yC} < \theta_y < \theta_{yC}$ for the interstitial plane along the y-axis. The maximum allowable angles of $\theta_{xA}$ and $\theta_{yA}$ will depend on the diffuser and are shown by $\theta_{x\_max}$ and $\theta_{y\_max}$, in the illustrated example. These maximum angles also determine the nearest position of the interstitial plane to the proximal end, and thus the maximum angles define the maximum size of the illumination volume measured from the back wall.

The diffuser 308 is further configured to produce an output beam with an illumination intensity criteria, $I_{min}(\theta)$, that minimizes off-axis irradiance over the illumination volume. In some embodiments, that means that the irradiance at the interstitial wall (also termed a load wall), at the sides and bottom of the vehicle trailer 202, should not fall below the irradiance at the back wall 210. That is, a consistent minimum irradiance should be maintained over the entire illumination volume 218, for example.

In other words, and as shown in the top view (FIG. 2A), the irradiance at the off-axis extent of the interstitial plane 220, i.e., at point "A," should be equal to or larger than irradiance at the back wall 210 at the corresponding off-axis extent (point "$A_O$").

To determine the conditions of the diffuser 308 for satisfying a minimum condition, irradiance, Ea, at the point "A" is defined. For the x-direction, the irradiance, Ea, as function of vehicle trailer width, W, angle $\theta_x$, and source illumination intensity $I(\theta_x)$, is expressed as follows:

$$E_a(\theta_x) = \frac{I(\theta_x)\cos(\theta_x)}{\left[\frac{.5\,W}{\sin(\theta_x)}\right]^2} \quad (4)$$

Ea should not decrease with angle $\theta x$. Therefore, Ea can be expressed as:

$$E_a(\theta_x) \geq E_a(\theta_{x0}), \text{ where } \theta_x \geq \theta_{x0} = \text{atan}\left(\frac{.5W}{L}\right) \quad (5)$$

where L is the length of back wall to the diffuser, e.g., the length of the vehicle trailer.

From expression (5), we obtain the following expression (6) of the horizontal intensity that the illumination pattern from the diffuser 308 is to follow, in various embodiments:

$$I_x(\theta_x) \geq I_{x\_min}(\theta_x) = I_x(\theta_{x0})\frac{\cos(\theta_{x0})\sin(\theta_{x0})^2}{\cos(\theta_x)\sin(\theta_x)^2} \quad (6)$$

Similarly, from the side view of the vehicle trailer 202 (FIG. 2B), irradiance, Ec, of a bottom of the interstation plane 220 (at point C) should be equal to or larger than irradiance of at point "$C_O$," at the back wall. From that similar condition, we determine a vertical intensity that the illumination patter from the diffuser 308 is to follow, in various embodiments as expression (7):

$$I_y(\theta_y) \geq I_{y\_min}(\theta_y) = I_y(\theta_{y0})\frac{\cos(\alpha)\sin(\alpha)^2}{\cos(\alpha+\theta_y)\sin(\alpha+\theta_y)^2} \quad (7)$$

where $\alpha$ is the tilt of the illumination system mounted at a proximal end of a vehicle trailer, as shown by way of example in FIG. 2B.

These expressions (6) and (7) describe minimum illumination intensity criteria along horizontal and vertical planes, as established by the diffuser, to achieve the desired irradiance over the illumination volume. Similar expressions can be derived for other irradiance conditions, as desired, to make sure that irradiance at or near the corners of the interstation plane 220 does not fall below the irradiance at or the corners of the back wall 210 of the vehicle trailer. This helps ensure proper illumination of these extremes.

Figure 4:
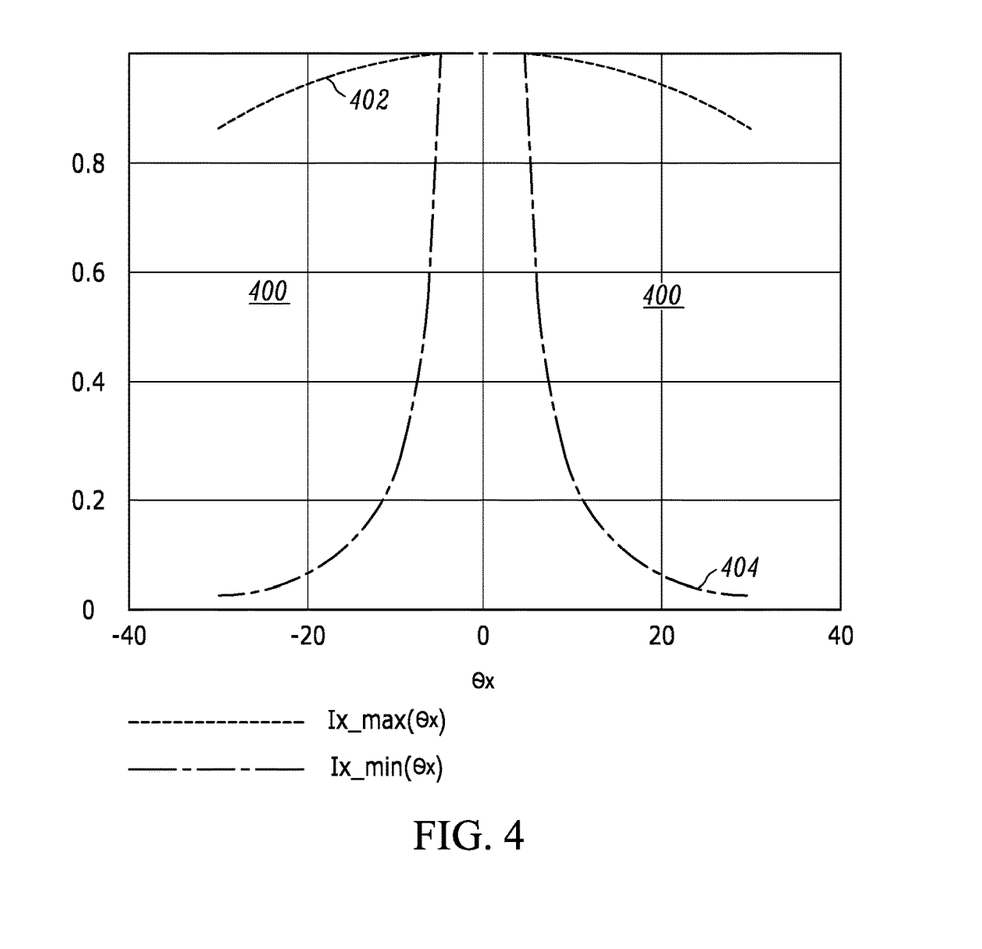
FIG. 4 is an illustration of an example illumination pattern criterion, in accordance with some embodiments.

FIG. 4 is an illustration of an intensity acceptability region 400 for a horizontal illumination intensity of an output beam emitted into a vehicle trailer, as determined by the illumination system in accordance with various embodiments. The acceptability region 400 is bounded, at the upper end, by a maximum illumination intensity curve 402 and, at the lower end, by a minimum illumination intensity curve 404. In the illustrated example, the curves 402 and 404 were determined from the example expressions (3) and (6). It will be appreciated, however, that these expressions are merely examples, and that other expressions (or illumination intensity criteria) may be used to determine the maximum curve 402 and minimum curve 404. While FIG. 4 illustrates an acceptability region for a horizontal illumination intensity, a similar profile would exist for a vertical illumination intensity, expect that in the illustrated example the diffuser is positioned to produce output beam at an angle relative to longitudinal y-axis. Furthermore, while the illustration is that of intensity, an acceptability region of irradiance may be also be defined, and would have a similar profile, albeit as a measure of irradiance as a function of off-axis angle.

Figure 5A:
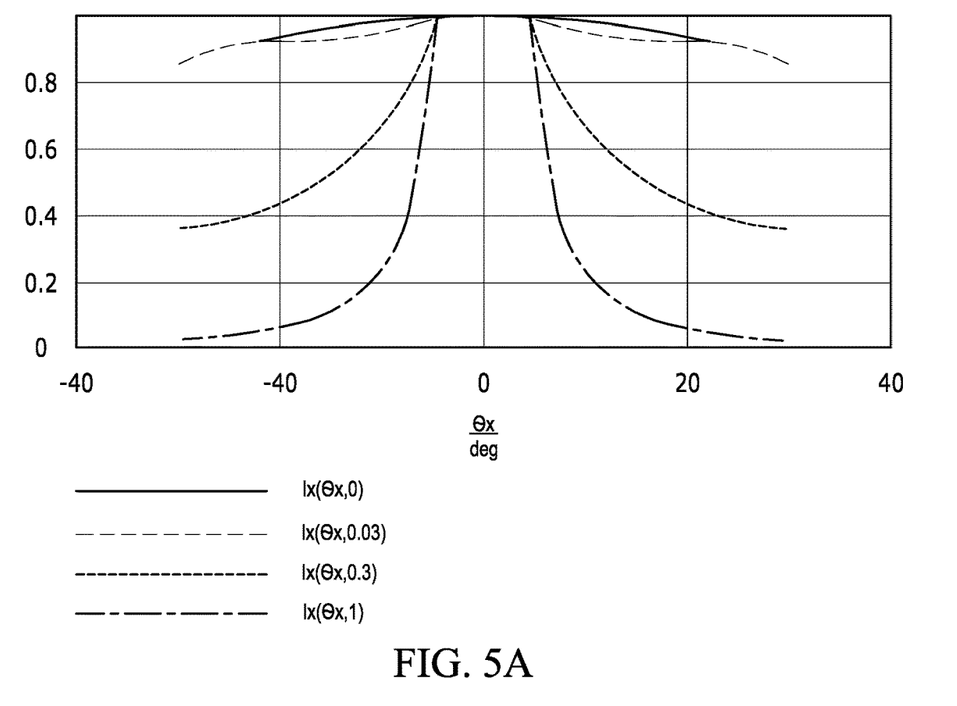
FIGS. 5A and 5B are further examples illumination pattern criteria, with varying shape factors, in accordance with some embodiments.
Figure 5B:
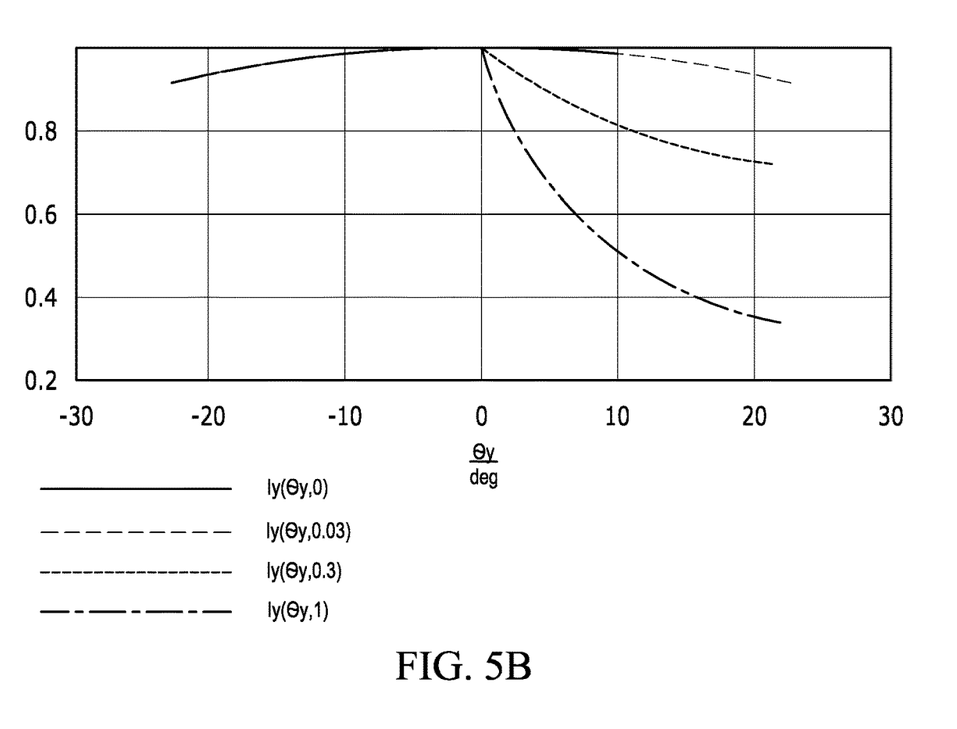

FIGS. 5A and 5B illustrate a plurality of example intensity acceptability regions, each determined by a design criterion factor and each of which may be used for more general scenarios of some embodiments herein. FIG. 5A illustrates illumination intensity acceptability regions for a horizontal illumination intensity of an output beam emitted into a vehicle trailer. FIG. 5B illustrates illumination intensity acceptability regions for vertical illumination intensity of that output beam. In comparison to expressions (6) and (7), the illumination pattern criteria for the acceptability regions in FIGS. 5A and 5B satisfy the following expressions:

$$I_x(\theta_x, kx) := \min\left[\cos(\theta_x), \left(\frac{\cos(\theta_{x0})\sin(\theta_{x0})^2}{\cos(\theta_x)\sin(\theta_x)^2}\right)^{kx}\right] \quad (8)$$

$$I_y(\theta_y, ky) := \text{if } \theta_y < 0, \cos(\theta_y), \quad (9)$$
$$\min\left[\cos(\theta_y), \left(\frac{\cos(\alpha)\sin(\alpha)^2}{\cos(\theta_y + \alpha)\sin(\theta_y + \alpha)^2}\right)^{ky}\right]$$

$$I(0_x, 0_y, kx, ky) := I_x(0_x, kx)I_y(0_y, ky) \quad (10)$$

where like definitions to that of FIGS. 2A and 2B are used here. In contrast to the expressions (6) and (7), the expressions (8) and (9) each depend on an additional design criterion, shape factor, expressed as kx for the horizontal axis shape factor and ky for the vertical axis shape factor.

The shape factor, k, is used to further define the resulting illumination intensity generated by a diffuser. The shape factor can range from 0 to 1. When the shape factor k=1, the result is a minimum illumination intensity, as shown in FIGS. 5A and 5B. In FIG. 5A, for example, the smallest minimum intensity curve 602 corresponds to a shape factor k=1, while the largest maximum intensity curve 604 corresponds to a shape factor of 0. Thus expression (8) can singularly define the minimum and maximum horizontal illumination intensity conditions, by virtue of having different shape factors. The same is true for expression (9) regarding vertical illumination intensity conditions. The shape factor, k, is a variable that can be used to trade off efficient of illumination of a back wall versus non-uniformity of intensity as an interstitial plane with the vehicle trailer.

In configurations, in which the diffuser is electronically controllable, a processor may be programed to adjust the shape factor to a desired value for the particular vehicle trailer to be illuminated. Vehicle trailer variables, such as length, width, and height may be used by the processor to determine a desired shape factor, which is then used to determine a diffusion profile for the diffusor. The processor may then communicate the desired diffusion profile to the diffusor.

Figure 6:
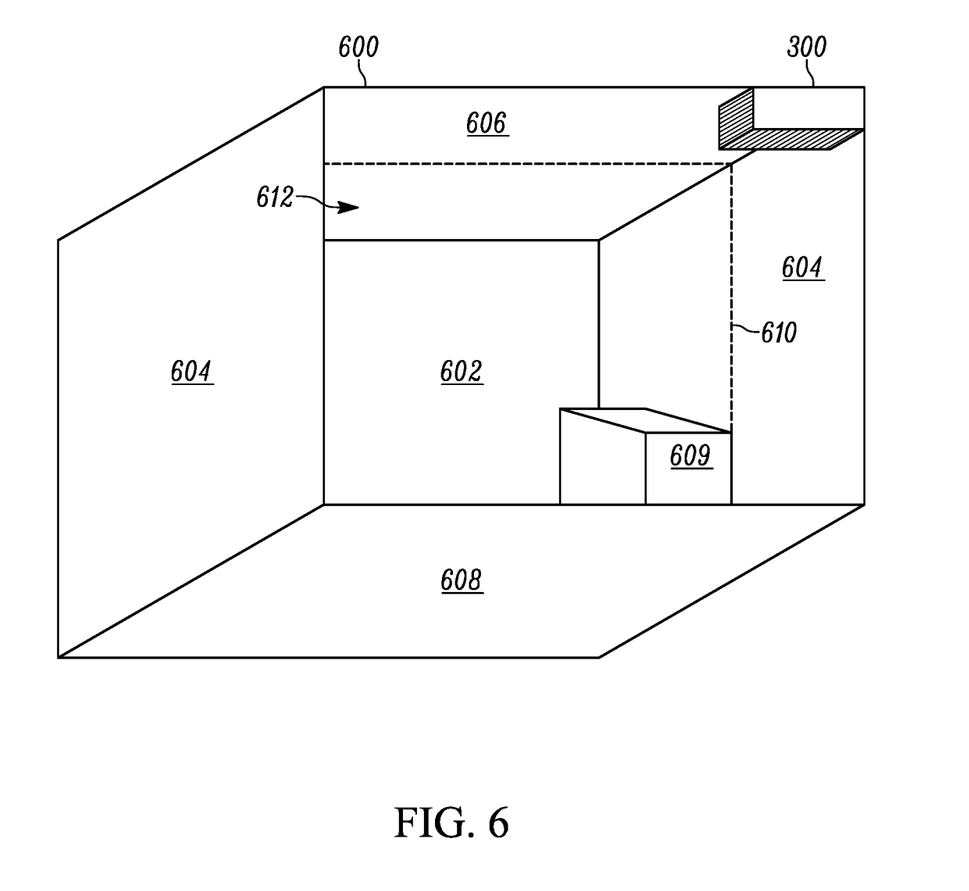
FIG. 6 illustrates another example vehicle trailer having an illumination system like that of FIG. 3 used for time-of-flight sensing applications, in accordance with some embodiments.

Returning to FIG. 3, the illumination system 300 may be used for time-of-flight 3D sensor measurements with a vehicle trailer, an example of which is described in relation to FIG. 6. These time-of-flight measurements may be used to identify objects within the vehicle trailer, to identify an interstitial plane corresponding to the nearest object in the vehicle trailer, to determine a consumed volume within a vehicle trailer, to determine an available volume within the vehicle trailer, to determine dimensions of objects with the trailer, and/or other applications.

In some time-of-flight embodiments, the light source 306 is an infrared laser source and the optical sensor 310 is a time-of-flight 3D image sensor configured to measure infrared light reflected (i.e., radiance) from within a vehicle trailer 600, e.g., off a back wall and off of objects in the vehicle trailer. In some embodiments, the processor 302 controls the light source 306 and the diffuser 308 to produce an illumination output beam having a desired illumination intensity pattern. The processor 302 controls the optical sensor 310 to then collect infrared image data from within the vehicle trailer and analyze that image data, either within the optical sensor 310 or within the processor 302, to determine 3D image data, from which the various characteristic values can be determined for the vehicle trailer and objects therein. In this way, the illumination system 300 can determine a location of a back wall 602 of the vehicle trailer 600, as well as locations of side walls 604, top wall 606, and bottom wall 608. From there, the illumination system 300 can determine the overall volume of the vehicle trailer 600. The illumination system 300 can also determine a location of a closest object 609 within the vehicle trailer 600, from which the illumination system 300 can identify the location of an interstitial plane 610. From there, the illumination system 300 can determine, applying the techniques herein, an illumination volume 612 and the illumination pattern needed to satisfy illumination criteria (and/or irradiance criteria) stored within the memory 304.

While not shown, in various embodiments, multiple light sources may be used to illuminate the desired illumination volume of a vehicle trailer. For example, a light source may include two laser emitters, each having a different diffuser, where one laser emitter-diffuser pair may produce a first shape factor, $k_1$, illumination pattern and a different laser emitter-diffuser pair may produce a second shape factor, $k_2$, illumination pattern, where $k_1 \neq k_2$, where $k_1 > k_2$ or where $k_1 < k_2$, for example. A processor within the illumination system would then determine which laser emitter-diffusion pair is used to produce the desired illumination volume. Or, in other example embodiments, the processor may be programed to control each of the pairs to fill different portions of the illumination volume, such that the entire volume is filled from combining the output beam from each. In some embodiments, one pair is used to illuminate a back wall to satisfy a desired first illumination criterion, while the other pair is used to illuminate an interstitial plane to satisfy a desired second illumination criterion. In some embodiments both pairs may be used to illuminate a back wall, and only one of the pairs is used to illuminate an interstitial plane.

The present techniques provide example systems and methods for an illumination system that produces an illumination intensity pattern that can minimize the number of light sources needed for long distance, e.g., 10 m to 20 m, 3D time-of-flight applications, including the 24 ft to 53 ft vehicle trailer length size common in vehicle shipping applications. The techniques herein may be implemented in trailer monitoring units have time-of-flight 3D sensors, although they are not limited to such applications, but rather may be used in any number of applications in which illumination criteria for a illumination volume are to be maintained.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description of the Invention, with each claim standing on its own as a separately claimed subject matter.

What is claimed is:

1. An illumination system comprising:
   a light source positioned at a proximal end of a volume and configured to emit a photon beam; and
   a diffuser positioned to receive the photon beam and to diffuse the photon beam into an output beam extending from a distal end plane of the volume to an interstitial plane in the volume thereby defining an illumination volume, the output beam having an illumination intensity that produces a threshold irradiance at a lateral off-axis extent of the distal end plane, the diffuser being further configured to maintain irradiance at a lateral off-axis extent of the interstitial plane at or above the threshold irradiance at the lateral off-axis extent of the distal end plane,
   wherein the output beam has an illumination intensity that produces a first irradiance profile at the distal end plane and a second irradiance profile at the interstitial plane, wherein the diffuser is configured such that the first irradiance profile varies across the distal end plane and wherein the second irradiance profile varies across the interstitial plane, wherein the diffuser is configured such that the illumination intensity of the output beam satisfies:

$$I(\theta) \leq I_{max}(\theta) = I_O \cos(\theta),$$

where θ is an angle from an illumination axis of the output beam, and where $I_O$ is an illumination intensity on the illumination axis, wherein the diffuser is further configured such that the illumination intensity of the output beam, I, is expressed as $I_x(\theta) \cdot I_y(\theta)$ satisfies:

$$I_x(\theta_x) \geq I_{x\_min}(\theta_x) = I_x(\theta_{x0}) \frac{\cos(\theta_{x0})\sin(\theta_{x0})^2}{\cos(\theta_x)\sin(\theta_x)^2},$$

where $\theta_{x0}$ is an angle from an illumination axis of the output beam as measured at the distal end plane along a x-axis, and where $\theta_x$ is an angle from an illumination axis of the output beam along the x-axis; and $$I_y(\theta_y) \geq I_{y\_min}(\theta_y) = I_y(\theta_{y0}) \frac{\cos(\theta_{y0})\sin(\theta_{y0})^2}{\cos(\theta_y)\sin(\theta_y)^2}$$

where $\theta_{y0}$ is an angle from an illumination axis of the output beam as measured at the distal end plane along a y-axis, and where $\theta_y$ is an angle from an illumination axis of the output beam along the y-axis.

2. The illumination system of claim 1, wherein the light source comprises a plurality of infrared light sources and wherein the diffuser comprises a plurality of diffusers, wherein each light source has a corresponding diffuser from the plurality of diffusers and wherein each diffuser has a different diffuser pattern.

3. An illumination system comprising:
a light source positioned at a proximal end of a volume and configured to emit a photon beam; and
a diffuser positioned to receive the photon beam and to diffuse the photon beam into an output beam extending from a distal end plane of the volume to an interstitial plane in the volume thereby defining an illumination volume, the output beam having an illumination intensity that produces a threshold irradiance at a lateral off-axis extent of the distal end plane, the diffuser being further configured to maintain irradiance at a lateral off-axis extent of the interstitial plane at or above the threshold irradiance at the lateral off-axis extent of the distal end plane,
wherein the output beam has an illumination intensity that produces a first irradiance profile at the distal end plane and a second irradiance profile at the interstitial plane, wherein the diffuser is configured such that the first irradiance profile varies across the distal end plane and wherein the second irradiance profile varies across the interstitial plane,
wherein the diffuser is configured such that the illumination intensity of the output beam satisfies:

$$I(\theta) \leq I_{max}(\theta) = I_O \cos(\theta),$$

where θ is an angle from an illumination axis of the output beam, and where $I_O$ is an illumination intensity on the illumination axis, wherein the diffuser is further configured such that the illumination intensity of the output beam, I, is expressed as $I_x(\theta) \cdot I_y(\theta)$ satisfies:

$$I_x(\theta_x) \geq I_{x\_min}(\theta_x) = I_x(\theta_{x0}) \frac{\cos(\theta_{x0})\sin(\theta_{x0})^2}{\cos(\theta_x)\sin(\theta_x)^2},$$

where $\theta_{x0}$ is an angle from an illumination axis of the output beam as measured at the distal end plane along a x-axis, and where $\theta_x$ is an angle from an illumination axis of the output beam along the x-axis; and $$I_y(\theta_y) \geq I_{y\_min}(\theta_y) = I_y(\theta_{y0}) \frac{\cos(\alpha)\sin(\alpha)^2}{\cos(\alpha+\theta_y)\sin(\alpha+\theta_y)^2},$$

where $\theta_{y0}$ is an angle from an illumination axis of the output beam as measured at the distal end plane along a y-axis, where $\theta_y$ is an angle from an illumination axis of the output beam along a y-axis, and where α is angle of deflection of the illumination axis from a reference direction for the illumination volume.

4. A method of illuminating a volume of interest, the method comprising:
generating a laser beam from a laser source positioned at a proximal end of the volume of interest and
illuminating the volume of interest by, diffusing the laser beam into an output beam, using a diffuser that projects the output beam into the volume of interest, to extend from a distal end plane of the volume to an interstitial plane in the volume, the output beam having an illumination intensity that produces a threshold irradiance at a lateral off-axis extent of the distal end plane, and wherein the diffusing diffuses the output beam to maintain irradiance at a lateral off-axis extent of the interstitial plane at or above the threshold irradiance at the lateral off-axis extent of the distal end plane,
wherein diffusing the output beam comprises maintaining a maximum illumination intensity in the volume of interest according to: $I(\theta) \leq I_{max}(\theta) = I_O \cos(\theta)$, where θ is an angle from an illumination axis of the output beam, and where $I_O$ is the illumination intensity on the illumination axis at the intersection of the illumination axis and the distal end plane, and
wherein diffusing the output beam further comprises maintaining a minimum illumination intensity of the output beam, I, expressed as $I_x(\theta) \cdot I_y(\theta)$ according to:

$$I_x(\theta_x) \geq I_{x\_min}(\theta_x) = I_x(\theta_{x0}) \frac{\cos(\theta_{x0})\sin(\theta_{x0})^2}{\cos(\theta_x)\sin(\theta_x)^2},$$

where $\theta_{x0}$ is an angle from an illumination axis of the output beam as measured at the distal end plane along a x-axis, and where $\theta_x$ is an angle from an illumination axis of the output beam along the x-axis; and $$I_y(\theta_y) \geq I_{y\_min}(\theta_y) = I_y(\theta_{y0}) \frac{\cos(\theta_{y0})\sin(\theta_{y0})^2}{\cos(\theta_y)\sin(\theta_y)^2},$$

where $\theta_{y0}$ is an angle from an illumination axis of the output beam as measured at the distal end plane along a y-axis, and where $\theta_y$ is an angle from an illumination axis of the output beam along the y-axis.

5. The method of claim 4, wherein the laser source is an infrared laser source, the method further comprising detecting images from within the volume of interest, using a three dimensional image sensor at the proximal end.

6. A method of illuminating a volume of interest, the method comprising:
   generating a laser beam from a laser source positioned at a proximal end of the volume of interest and
   illuminating the volume of interest by, diffusing the laser beam into an output beam, using a diffuser that projects the output beam into the volume of interest, to extend from a distal end plane of the volume to an interstitial plane in the volume, the output beam having an illumination intensity that produces a threshold irradiance at a lateral off-axis extent of the distal end plane, and wherein the diffusing diffuses the output beam to maintain irradiance at a lateral off-axis extent of the interstitial plane at or above the threshold irradiance at the lateral off-axis extent of the distal end plane,
   wherein diffusing the output beam comprises maintaining a maximum illumination intensity in the volume of interest according to: $I(\theta) \leq I_{max}(\theta) = I_O \cos(\theta)$, where $\theta$ is an angle from an illumination axis of the output beam, and where $I_O$ is the illumination intensity on the illumination axis at the intersection of the illumination axis and the distal end plane, and
   wherein diffusing the output beam further comprises maintaining a minimum illumination intensity of the output beam according to:

$$I_x(\theta_x) \geq I_{x\_min}(\theta_x) = I_x(\theta_{x0}) \frac{\cos(\theta_{x0})\sin(\theta_{x0})^2}{\cos(\theta_x)\sin(\theta_x)^2},$$

where $\theta_{x0}$ is an angle from an illumination axis of the output beam as measured at the distal end plane along a x-axis, and where $\theta_x$ is an angle from an illumination axis of the output beam along the x-axis; and $$I_y(\theta_y) \geq I_{y\_min}(\theta_y) = I_y(\theta_{y0}) \frac{\cos(\alpha)\sin(\alpha)^2}{\cos(\alpha + \theta_y)\sin(\alpha + \theta_y)^2},$$

where $\theta_{y0}$ is an angle from an illumination axis of the output beam as measured at the distal end plane along a y-axis, where $\theta_y$ is an angle from an illumination axis of the output beam along a y-axis, and where $\alpha$ is angle of deflection of the illumination axis from a reference direction for the illumination volume.

7. A of method of illuminating a volume of interest, the method comprising:
   generating a laser beam from a laser source positioned at a proximal end of the volume of interest and
   illuminating the volume of interest by, diffusing the laser beam into an output beam, using a diffuser that projects the output beam into the volume of interest, to extend from a distal end plane of the volume to an interstitial plane in the volume, the output beam having an illumination intensity that produces a threshold irradiance at a lateral off-axis extent of the distal end plane, and wherein the diffusing diffuses the output beam to maintain irradiance at a lateral off-axis extent of the interstitial plane at or above the threshold irradiance at the lateral off-axis extent of the distal end plane,
   wherein diffusing the output beam comprises maintaining a maximum illumination intensity in the volume of interest according to: $I(\theta) \leq I_{max}(\theta) = I_O \cos(\theta)$, where $\theta$ is an angle from an illumination axis of the output beam, and where $I_O$ is the illumination intensity on the illumination axis at the intersection of the illumination axis and the distal end plane, and
   wherein diffusing the output beam further comprises maintaining an illumination intensity of the output beam according to:

$$I_x(\theta_x, kx) := \min\left[\cos(\theta_x), \left(\frac{\cos(\theta_{x0})\sin(\theta_{x0})^2}{\cos(\theta_x)\sin(\theta_x)^2}\right)^{kx}\right]$$

$$I_y(\theta_y, ky) := \text{if } \theta_y < 0,$$

$$\cos(\theta_y), \min\left[\cos(\theta_y), \left(\frac{\cos(\alpha)\sin(\alpha)^2}{\cos(\theta_y + \alpha)\sin(\theta_y + \alpha)^2}\right)^{ky}\right]\right]$$

where $I_x(\theta)$ is the illumination intensity along a x-axis as a function of $\theta$, which is an angle from the x-axis, where $I_y(\theta)$ is the illumination intensity along a y-axis as a function of $\theta$, where $\theta_{x0}$ is an angle from an illumination axis of the output beam as measured at the distal end plane along a x-axis, where $\theta_x$ is an angle from an illumination axis of the output beam along the x-axis, where $\theta_{y0}$ is an angle from an illumination axis of the output beam as measured at the distal end plane along a y-axis, where $\theta_y$ is an angle from an illumination axis of the output beam along a y-axis, and where $\alpha$ is angle of deflection of the illumination axis from a reference direction for the illumination volume.

* * * * *